Figure 4:
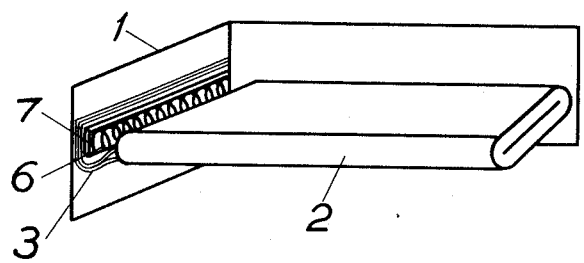

Sept. 25, 1951  B. O. N. HANSSON  2,569,306
ELECTRIC CONDENSER
Filed April 23, 1946  3 Sheets-Sheet 1
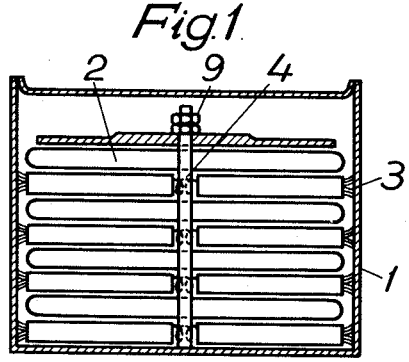
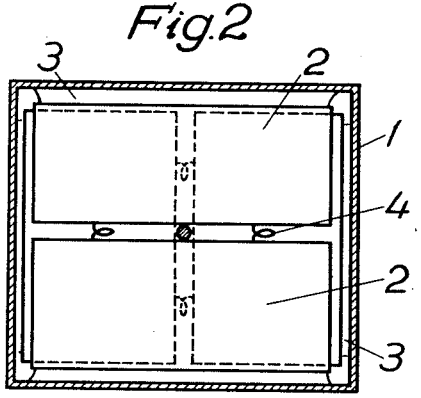
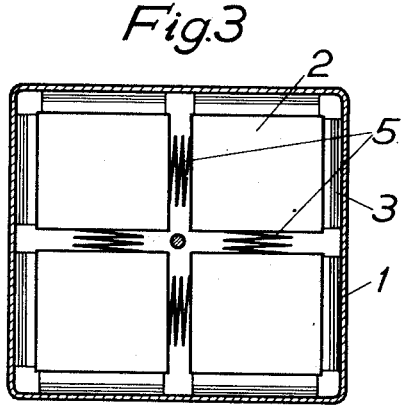
Inventor
Bror Olov Nikolaus Hansson Sept. 25, 1951        B. O. N. HANSSON        2,569,306
                      ELECTRIC CONDENSER Filed April 23, 1946                    3 Sheets-Sheet 2

Inventor
Bror Olov Nikolaus Hansson
By James Aiken
     Attorney.

Sept. 25, 1951 B. O. N. HANSSON 2,569,306
ELECTRIC CONDENSER
Filed April 23, 1946 3 Sheets-Sheet 3
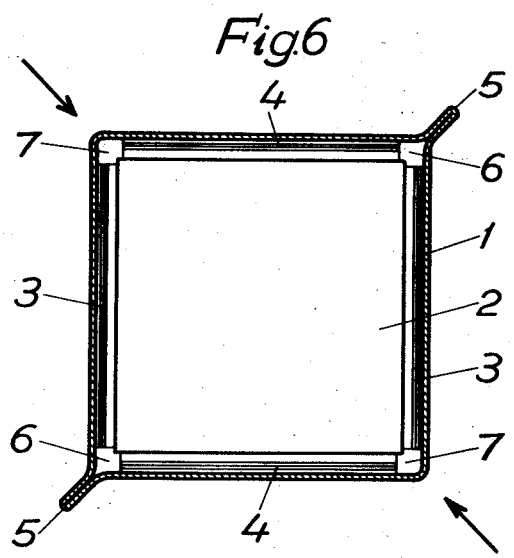
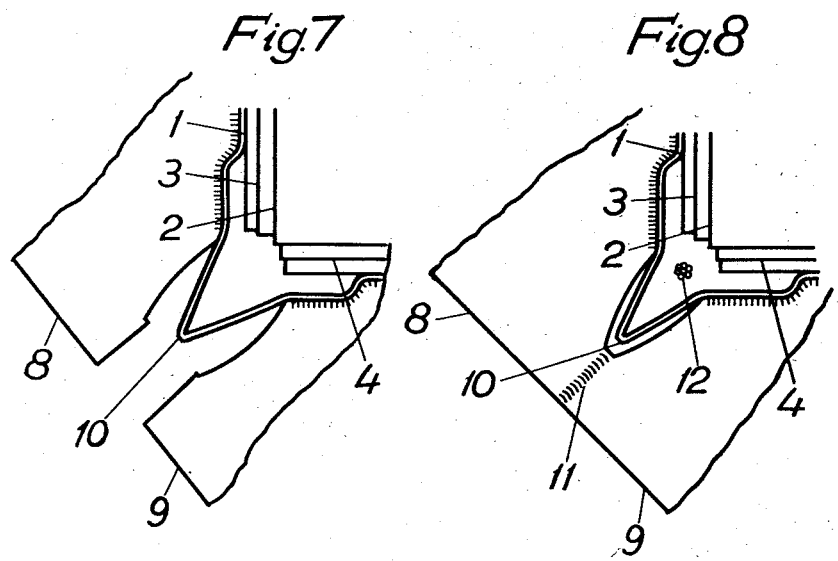
Inventor
Bror Olov Nikolaus Hansson
By James Aiken
Attorney Patented Sept. 25, 1951

2,569,306

UNITED STATES PATENT OFFICE 2,569,306

ELECTRIC CONDENSER

Bror Olov Nikolaus Hansson, Angby, Sweden, assignor to Allmanna Svenska Elektriska Aktiebolaget, Vasteras, Sweden, a corporation of Sweden Application April 23, 1946, Serial No. 664,152
In Sweden May 5, 1945

13 Claims. (Cl. 175—41)

The present invention relates to electric condensers, in which the metal foils protrude outside the intermediary insulation and make heat dissipating contact with a wall in a tank enclosing the condenser. This is as a rule filled with an insulating fluid standing under pressure and is besides either forced air cooled or water cooled. With these means the load capacity of the condenser has been considerably increased in comparison with a conventional condenser. In spite of this the load capacity is to a very high degree limited by the fact that the surface of the foil cooling is confined to one wall only in the tank, generally its bottom surface.

The condenser, forming object of the present invention consists of several condenser rolls which are preferably made in or pressed to flat form and piled on each other so that the cooling foils in the pile will be turned in different directions and in the most possible even distribution will make heat dissipating contact with at least two walls in the container.

This condenser has not the limitation in the load capacity mentioned above and has moreover also other advantages of which we beg to mention the following:

For the same condenser volume the foil cooled surface is 2–4 times larger than in the condenser type previously mentioned. Condensers which must previously be cooled by forced air, may now be self cooled, and condensers which have been so heavily loaded that water cooling has been desired may now be cooled by forced air.

Flat rolls can be used. This is of importance, partly on account of the increase in capacity a pressing to flat form incurs, and partly because the flat form giving a cheaper and more simple separating of the various part condensers from each other than has hitherto been possible in a large round roll.

The form of the condensers enables a more simple building together of several units to a battery according to the building block principle.

The protruding foils of the roll may easily be soldered to the cooling wall of the tank.

The cooling fins of the tank will always be turned outwards. This also contributes to improved cooling.

Figure 5:
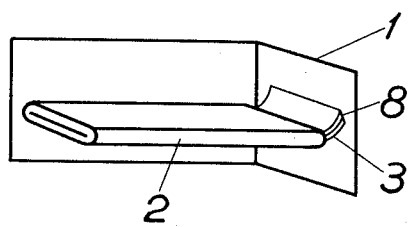

The attached drawing illustrates the invention. Fig. 1 shows a longitudinal and Fig. 2 a transversal section of a condenser with two rolls in each layer. Fig. 3 is also a section of a condenser but with four rolls in each layer. Figs. 4 and 5 show different detailed arrangements of contact between the cooling foils and the wall of the tank.

In the above Figs. 1–5 the cooling foils of the rolls are pressed against the walls of the tank by means of an inner force. In the Figures 6–8 the walls of the tank are pressed against the cooling foils by means of an outer force.

Fig. 6 is a cross section of a condenser tank with two diagonally opposite corners tightly pressed together. Fig. 7 shows a cross section of a corner of a condenser tank with cooling fins before, and in Fig. 8 after the pressing, whereby the corner is not entirely pressed together.

In Figs. 1 and 2, 1 signifies the tank which has prismatic shape and in which the condenser rolls 2 pressed to flat form are put down in layers and pressed together by means of the screw 9. The inner section of the tank is square. Its side is about equal to the roll but about twice as large as the width of the roll. Two rolls abreast are therefore contained in each layer of the tank. The rolls are laid so that the protruding foils 3 in each layer are pressed against opposite sides in the tank and are turned 90° for each new layer. The foils are pressed against the sides of the tank by means of springs 4, arranged between the rolls in each layer.

In Fig. 3 both the length and width of the roll is about equal to or slightly less than half the inner width of the tank, wherefor four rolls have room in each layer in the tank. As in Fig. 2 the rolls are turned 90° for every new layer, whereby the cooling foils 3 are pressed against the sides of the tank by means of long springs 5 between the piles of the rolls.

In the arrangement shown at Figs. 2 and 3, the terminals of the non-projecting foils of the condenser rolls consist of metal strips embedded in the paper insulation of the rolls and protruding therefrom into the corners of the container, where they are connected to leads accommodated in the spaces available in said corners, and such a lead is shown at 12 in Fig. 8.

Fig. 4 shows a roll 2, the cooling foils 3 of which are bent as a bow and are pressed against the wall of the tank by means of the spiral spring 6. A lath 7 of wood or presspahn is placed between the spring and the foil.

In Fig. 5 the cooling foil 3 is also bent upwards, but by means of soldering or welding at 8 it is fastened to the wall 1 of the tank. This soldering or welding is made for each roll as they are put down in the tank.

The cooling can further be increased if double-sided cooling is used. In this case either one foil of the roll is protruding at both ends or both foils are protruding, the one at one end and the other at the other end of the roll. When both foils are protruding, one of the same must be insulated against the wall of the tank. Double-sided foil cooling is preferably used when only one roll with length and width adapted to the section of the tank is put in each layer.

In Fig. 6 the condenser tank 1 has square section. The rolls 2 are flat. The cooling foil 3 goes straight through the roll and protrudes at both ends. The other foil is covered by the insulation of the roll. Length and width are about equal or slightly less than the width of the tank, so that when the rolls are laid into the tank before its pressing together, the cooling foils are making contact with two opposite sides of the tank. The rolls are laid so that the cooling foils lying above, for instance 3, are turned 90° in relation to the cooling foil 4 of the roll lying nearest underneath.

According to the invention the four sides of the tank are pressed against the cooling foils by means of an outer force. Before the pressing together the corners of the tank are provided with flexible folds for this purpose. Preferably only two diagonally opposite corners are made in this manner. At the pressing together in hydraulic or other suitable press the force works mainly perpendicularly against the connecting line between these corners. On the drawing the directions of the forces are marked with arrows. The corners 5 are tightly pressed together. In this position they are fixed by means of welding, riveting or the like. The cooling fins also may be arranged as fixing means when arranged perpendicularly to the longitudinal direction of the tank. Preferably they are then made in one piece with a hole cut according to the section of the tank and pressed on the same. In the four corners of the tank a small duct 6, 7 is always formed through which the rolls may be evacuated and impregnated and terminal leads may be drawn.

In Figs. 7 and 8 the significations are the same as in Fig. 6. The tank is provided with cooling fins made in two halves welded to the wall of the tank 1 except in the corners with the flexible folds. The drawing only shows one corner of the tank with the fold 10. After the pressing together the two halves 8, 9 of the cooling fins have also been brought together and welded to each other at 11, but not with the fold 10, which has only partly been pressed together so that a somewhat larger duct than in Fig. 6 is formed for leads 12, evacuating and impregnating.

I claim as my invention:

1. An electric condenser comprising a container, condenser rolls in flat form piled upon each other in the container, and electrode foils protruding from the rolls, such rolls being so disposed in angular relation to each other that the electrode foils protrude in four different directions and are distributed as evenly as possible all around the stack of condenser rolls and further arranged so as to ensure heat dissipating contact between the electrode foils protruding from the four sides of the stack and the four walls of the container surrounding the stack.

2. An electric condenser according to claim 1, in which each roll has electrode foils protruding at both ends.

3. An electric condenser according to claim 1, in which the width of each roll is approximately equal to half the internal width of the container.

4. An electric condenser according to claim 1, in which the length and the width of each roll are each approximately equal to half the internal width of the container.

5. An electric condenser according to claim 1, having flexible means inside the container whereby the electrode foils are pressed against the container walls.

6. An electric condenser according to claim 1, in which the electrode foils are soldered to the walls.

7. An electric condenser according to claim 1, comprising flexible folds in the container in two diagonally opposite corners, the walls of the container being pressed against the protruding electrode foils mainly perpendicularly to the connecting line between said corners.

8. An electric condenser according to claim 1, comprising externally applied means whereby the walls are maintained in pressed position against the protruding electrode foils.

9. An electric condenser according to claim 1, comprising external means whereby the walls are maintained in pressed position against the protruding electrode foils, the said means being arranged as cooling fins.

10. An electric condenser according to claim 1, comprising flexible folds in the container in two diagonally opposite corners, cooling fins welded to the container except at the flexible folds.

11. An electric condenser according to claim 1, comprising folds in the container in two diagonally opposite corners tightly pressed together and welded.

12. An electric condenser comprising a container having four flat side walls, condenser rolls in flat form piled upon each other in the form of a four-sided stack within the container, and electrode foils protruding uniformly from all four sides of the stack, the rolls being so disposed in angular relation to each other in the stack that the said foils are equally distributed between the four sides of the stack, and each of the four flat walls of the container being in heat dissipating relation to the foils protruding from one of the four sides of the stack for the uniform radiation of heat to the outer air from all four of the container side walls.

13. Electrical condenser unit composed of a casing having flat walls, two condenser reels, and a spring device between said condenser reels arranged to press the end surfaces of said condenser reels against the flat casing walls.

BROR OLOV NIKOLAUS HANSSON.

REFERENCES CITED

The following references are of record in the file of this patent:

UNITED STATES PATENTS

| Number | Name | Date |
| --- | --- | --- |
| 2,028,564 | Robinson | Jan. 21, 1936 |
| 2,151,787 | Marbury | Mar. 28, 1939 |
| 2,186,842 | Scoville | Jan. 9, 1940 |